US012100584B2

(12) United States Patent
Willis et al.

(10) Patent No.: US 12,100,584 B2
(45) Date of Patent: Sep. 24, 2024

(54) METHODS AND SYSTEMS FOR MULTI-PASS ENCODED FREQUENCY PUSHING

(71) Applicant: LECO Corporation, St. Joseph, MI (US)

(72) Inventors: Peter Markel Willis, Benton Harbor, MI (US); Jonathan Jaloszynski, Saint Joseph, MI (US)

(73) Assignee: LECO Corporation, St. Joseph, MI (US)

( * ) Notice: Subject to any disclaimer, the term of this patent is extended or adjusted under 35 U.S.C. 154(b) by 350 days.

(21) Appl. No.: 17/625,682

(22) PCT Filed: Jul. 10, 2020

(86) PCT No.: PCT/US2020/041707
§ 371 (c)(1),
(2) Date: Jan. 7, 2022

(87) PCT Pub. No.: WO2021/011415
PCT Pub. Date: Jan. 21, 2021

(65) Prior Publication Data
US 2022/0262616 A1 Aug. 18, 2022

Related U.S. Application Data

(60) Provisional application No. 62/873,381, filed on Jul. 12, 2019.

(51) Int. Cl.
*H01J 49/40* (2006.01)
*H01J 49/02* (2006.01)
*H01J 49/42* (2006.01)

(52) U.S. Cl.
CPC .......... *H01J 49/401* (2013.01); *H01J 49/025* (2013.01); *H01J 49/406* (2013.01); *H01J 49/4215* (2013.01)

(58) Field of Classification Search
CPC ...... H01J 49/025; H01J 49/401; H01J 49/406; H01J 49/403; H01J 49/405; H01J 49/4215
See application file for complete search history.

(56) References Cited

U.S. PATENT DOCUMENTS 6,888,130 B1 5/2005 Gonin
2005/0242279 A1 11/2005 Verentchikov
(Continued)

FOREIGN PATENT DOCUMENTS

DE 112007002747 T5 10/2009
DE 112011101514 T5 5/2013
(Continued)

OTHER PUBLICATIONS

International Search Report mailed Oct. 14, 2020, relating to International Application No. PCT/US2020/041707.
(Continued)

*Primary Examiner* — David E Smith
(74) *Attorney, Agent, or Firm* — Honigman LLP

(57) ABSTRACT

A time-of-flight mass spectrometer (TOF MS) comprises a mass analyzer, an ion pushing device, a filtering device, a multi-pass reflector, a detector, and a decoder. The ion pushing device is arranged to push ions into the mass analyzer. The filtering device is arranged to filter a portion of the ions based on a mass range of the ions. The multi-pass reflector is arranged to selectively reflect the ions for further passes through the mass analyzer. The detector is arranged to receive the ions. The decoder is arranged to reconstruct a mass spectrum for the entire mass range of the ions.

16 Claims, 13 Drawing Sheets

(56) References Cited

U.S. PATENT DOCUMENTS

| | | | | |
|---|---|---|---|---|
| 2013/0048852 | A1* | 2/2013 | Verenchikov | H01J 49/22 250/282 |
| 2013/0234016 | A1 | 9/2013 | Giles et al. | |
| 2015/0233866 | A1* | 8/2015 | Verenchikov | G01N 27/623 250/282 |
| 2016/0155624 | A1 | 6/2016 | Verenchikov et al. | |
| 2017/0084443 | A1* | 3/2017 | Willis | H01J 49/0027 |
| 2020/0365383 | A1* | 11/2020 | Verenchikov | H01J 49/4225 |

FOREIGN PATENT DOCUMENTS

| | | | |
|---|---|---|---|
| JP | 2005538346 | A | 12/2005 |
| JP | 2010509743 | A | 3/2010 |
| JP | 2010512633 | A | 4/2010 |
| JP | 2010277970 | A | 12/2010 |
| JP | 2013525986 | A | 6/2013 |
| JP | 2013528892 | A | 7/2013 |
| JP | 5350264 | B2 | 11/2013 |
| JP | 2015526723 | A | 9/2015 |
| KR | 1020150130557 | A | 11/2015 |
| WO | 2010038260 | A1 | 4/2010 |
| WO | 2018109920 | A1 | 6/2018 |
| WO | 2019030475 | A1 | 2/2019 |

OTHER PUBLICATIONS

Japanese Patent Office, Office Action for Application No. 2021-577137 dated Feb. 9, 2023.

German Patent Office, Office Action for Application No. 112020003336.8 dated Jan. 22, 2024.

International Preliminary Report on Patentability and Written Opinion relating to Application No. PCT/US2020/041707 dated Jan. 27, 2022.

United Kingdom Intellectual Property Office, Examination Report for Application GB2118602.8 dated Apr. 25, 2024.

* cited by examiner

METHODS AND SYSTEMS FOR MULTI-PASS ENCODED FREQUENCY PUSHING

CROSS REFERENCE TO RELATED APPLICATIONS

This PCT application claims priority to U.S. Provisional Application No. 62/873,381, filed on Jul. 12, 2019, the disclosure of which is considered part of the disclosure of this application and is hereby incorporated by reference in its entirety.

TECHNICAL FIELD

This disclosure relates to the field of mass spectroscopic analysis, and more particularly to a method of simultaneously improving the mass resolution, sensitivity, dynamic range, and mass range of time-of-flight mass spectrometers with an extended flight path.

BACKGROUND

Time-of-flight mass spectrometers (TOF MS) are widely used in analytical chemistry for identification and quantitative analysis of various mixtures. To increase the mass resolution of TOF MS, U.S. Pat. No. 5,017,780, discloses a folded path multi-reflecting time-of-flight mass spectrometer (MR-TOF MS). The mass resolution of MS is improved at the expense of proportionally reducing the sensitivity and dynamic range (i.e., a two-fold improvement in mass resolution is accompanied by a fifty percent reduction in sensitivity).

The mass resolution of an MR-TOF MS may be further improved by operating the mass analyzer in a mode where the ions have an extended flight path by directing them to take two passes through the mass analyzer before arriving at the ion detector (multi-pass mode). By doubling the flight time, the mass resolution is approximately doubled; however, by operating in multi-pass mode the sensitivity and dynamic range are further reduced by a factor of two. In addition, because of the double pass through the mass analyzer, operating in multi-pass mode requires that the mass range is restricted to a four-to-one range (i.e., mass 100 to 400) which limits the usefulness of operating in multi-pass mode.

U.S. Pat. No. 9,984,862, filed Aug. 1, 2016, which is hereby incorporated herein by reference in its entirety, discloses a scheme of improving the sensitivity and dynamic range of a MR-TOF MS by fast pulsing an ion source using a predetermined pulse sequence with unique intervals between pulse pairs, acquiring the resulting overlapped spectra, and decoding the spectra using logical analysis of the data along with the information of the pulse intervals. An example of a decoder that may be implemented is set forth in U.S. Pat. No. 9,786,484, filed as PCT App. No. PCT/US2015/031173 on May 15, 2015, the disclosure of which is hereby incorporated herein by reference in its entirety. However, this technique using, e.g., this decoder, is only applicable to operating an MR-TOF MS in normal mode, not multi-pass mode.

While mass spectrometry instruments may be adequate in certain respects, the sensitivity and mass range of certain instruments—particularly, MR-TOF MS instruments—may be improved.

SUMMARY

One aspect of the disclosure provides a time-of-flight mass spectrometer (TOF MS) comprising a mass analyzer, an ion pushing device, a filtering device, a multi-pass reflector, a detector, and a decoder. The ion pushing device is arranged to push ions into the mass analyzer. The filtering device is arranged to filter a portion of the ions based on a mass range of the ions. The multi-pass reflector is arranged to selectively reflect the ions for further passes through the mass analyzer. The detector is arranged to receive the ions. The decoder is arranged to reconstruct a mass spectrum for the entire mass range of the ions.

Implementations of the disclosure may include one or more of the following features. In some implementations, the TOF MS is operating in multi-pass mode where the ions take more than one pass through the mass analyzer to increase flight time and mass resolution.

The filtering device may be arranged to remove ions outside of a mass range window of interest. The filtering device may include a deflect pulser arranged to remove a portion of the ions after the ions are pushed by the ion pushing device. The deflect pulser may be arranged to progressively change a pass window during subsequent pushes of the ions to selectively reject one or more of the ions outside of a moving mass range window of interest.

The filtering device may include a quadrupole arranged to remove a portion of the ions before the ions are pushed by the ion pushing device. The quadrupole may be arranged to progressively change a pass window during subsequent pushes of the ions to selectively reject one or more of the ions outside of a moving mass range window of interest.

The ion pushing device may be arranged to implement an encoding pattern to define the timing of push intervals for the ions. The encoding pattern may be substantially random, or the encoding pattern may be calculated to minimize repeated interferences.

Another aspect of the disclosure provides a method for operating a time-of-flight mass spectrometer (TOF MS). The method includes pushing, via an ion pushing device, ions into a mass analyzer of the TOF MS. The method includes filtering, via a filtering device, a portion of the ions based on a mass range of the ions. The method includes reflecting, via a multi-pass reflector, the ions for further passes through the mass analyzer. The method includes receiving, via a detector, the ions. The method includes reconstructing, via a decoder, a mass spectrum for the entire mass range of the ions.

Implementations of the disclosure may include one or more of the following features. In some implementations, the TOF MS is operating in multi-pass mode where the ions take more than one pass through the mass analyzer to increase flight time and mass resolution.

The filtering device may remove ions outside of a mass range window of interest. The filtering device may include a deflect pulser arranged to remove a portion of the ions after the ions are pushed by the ion pushing device. The deflect pulser may be arranged to progressively change a pass window during subsequent pushes of the ions to selectively reject one or more of the ions outside of a moving mass range window of interest.

The filtering device may include a quadrupole arranged to remove a portion of the ions before the ions are pushed by the ion pushing device. The quadrupole may be arranged to progressively change a pass window during subsequent pushes of the ions to selectively reject one or more of the ions outside of a moving mass range window of interest.

The ion pushing device may be arranged to implement an encoding pattern to define the timing of push intervals for the ions. The encoding pattern may be substantially random, or the encoding pattern may be calculated to minimize repeated interferences.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
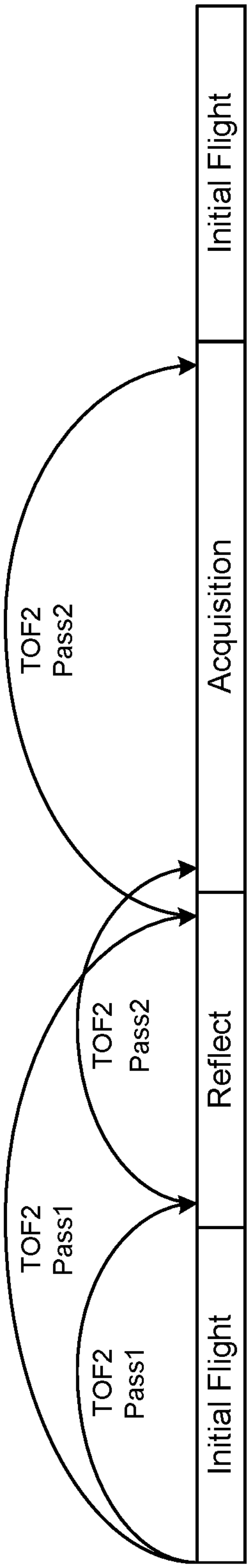
FIG. 1 is a schematic representation of a MR-TOF mass spectrometer operating in multi-pass mode in accordance with principles of the present disclosure.

The following description of the various embodiments is merely exemplary in nature and is in no way intended to limit the invention, its application or uses. For brevity, the disclosure hereof will illustrate and describe a multi-reflecting time-of-flight mass spectrometer (MR-TOF MS) system in various exemplary embodiments; however, it is to be generally understood that any suitable mass spectrometry system may be utilized. Based on the foregoing, it is to be generally understood that the nomenclature used herein is simply for convenience and the terms used to describe the invention should be given the broadest meaning by one of ordinary skill in the art.

The systems and methods described herein refer to a MR-TOF mass spectrometer, such as that described in U.S. Pat. No. 7,385,187, filed as PCT App. No. PCT/US2004/019593 on Jun. 18, 2004, and the systems and methods described herein may implement Encoded Frequent Pulses (EFP), such as that described in U.S. Pat. No. 9,406,493, filed on Oct. 3, 2014, the disclosures of which are hereby incorporated herein by reference in their entireties. EFP may also be referred to as Encoded Frequent Pushing.

A MR-TOF mass spectrometer may improve mass resolution while maintaining a moderate instrument size. However, the high mass resolution may result in reduced sensitivity due to the low duty-cycle introduction of ions into the MR-TOF mass spectrometer necessitated by a long flight time. The implementation of EFP may recover some of the lost sensitivity in the mass spectrometer by increasing the duty-cycle using an encoded pattern of push pulses with unique push intervals and a numerical means to decode the signal using the encoded pattern.

The mass spectrometer may also be operated in what is known as multi-pass mode (or zoom mode), where ions traverse the mass spectrometer two or more times to improve mass resolution. Multi-pass mode is accomplished by employing a controllable reflection at the end of the long flight path (e.g., using a multi-pass reflector), which, when active, will turn the ions around for another pass through the mass spectrometer, and, when inactive, will allow the ions to reach a detector. The mass resolution may be improved as the number of passes through the mass spectrometer increases, while the sensitivity may be reduced, and the mass-to-charge (MZ) ratio range may be more severely restricted with each pass. For example, an MR-TOF mass spectrometer operated with two-passes through its mass spectrometer may achieve approximately two-fold improvement (i.e., proportional improvement) in mass resolution accompanied by a two-fold loss in ion sensitivity, and a mass range that is restricted to 4:1 (i.e., 100 MZ to 400 MZ).

The restricted mass range may be due to operation of the multi-pass reflector. After a single pass through the mass spectrometer, the ions have separated based upon their mass-to-charge ratio. The reflector may be configured to activate in time to reflect the lightest ions of interest for a second pass. The reflector may be configured to then deactivate in time for the lightest ions to reach the detector after their second pass. So the heavier ion may reach the reflector before it deactivates in order to be reflected for a second pass. Thus, the single-pass flight time of the heaviest ions may be approximately equal to the double-pass flight time of the lightest ions.

The ions in a typical TOF instrument may have the relationship that their time-of-flight is approximately proportional to the square-root of their mass-to-charge ratio:

$$TOF = k * \sqrt{MZ}$$

where TOF is the time-of-flight, k is a proportionality constant that is a positive, non-zero number, and MZ is the mass-to-charge ratio.

For a two-pass multi-pass mode, the flight time of the heaviest ions is approximately twice that of the lightest ions, so the mass range will be roughly 4:1, as illustrated in the equations below:

$$\frac{TOF_{Heavy}}{TOF_{Light}} = 2 = \frac{\sqrt{MZ_{Heavy}}}{\sqrt{MZ_{Light}}}$$

-continued $$\left(\sqrt{\frac{MZ_{Heavy}}{MZ_{Light}}}\right)^2 = \frac{MZ_{Heavy}}{MZ_{Light}} = (2)^2 = 4$$

where $TOF_{Heavy}$ is the time-of-flight of the heaviest ions, $TOF_{Light}$ is the time-of-flight of the lightest ions, $MZ_{Heavy}$ is the mass-to-charge ratio of the heaviest ions, and $MZ_{Light}$ is the mass-to-charge ratio of the lightest ions.

The mass range may be restricted to about 3.5:1 since the reflector may activate sufficiently before the lightest ions reach the reflector after their first pass, and again deactivate sufficiently before the lightest ions arrive after their second pass. Multi-pass mode's inherent mass range restriction and sensitivity reduction may limit its usefulness in practical applications. FIG. 1 illustrates the timing of multi-pass mode operation.

Accordingly, the sensitivity, dynamic range, and mass range of the MR-TOF mass spectrometer may be improved by: (i) introducing a sequence of overlapped and encoded pushes with at least partially unique push intervals; (ii) restricting the mass range of the ions from each of the encoded pushes to avoid aliasing; (iii) operating the timing of the multi-pass reflector to pass multiple mass ranges from multiple pushes; and (iv) deploying a numerical decoder having knowledge of the push sequence, reflector timing, and ion flight times to reconstruct a high-resolution mass spectrum.

Multi-pass encoded frequency pushing (MP-EFP) may allow mass analysis to benefit from the enhanced mass resolution of multi-pass mode, while enjoying an extended mass range and high sensitivity. Such a configuration may include precise and detailed interaction between an ion pushing device, the multi-pass reflector, the encoder, and the decoder to ensure adequate operation. These components working in concert together during multi-pass mode is a significant improvement over prior mass spectrometry systems.

For example, the MR-TOF mass spectrometer may operate in a double-pass multi-pass mode with a mass range of 10:1, which may be a practical range for many experiments. The flight times of the heaviest to the lightest ions may have a ratio of approximately 3.16, as illustrated below:

$$\frac{TOF_{Heavy}}{TOF_{Light}} = \sqrt{\frac{MZ_{Heavy}}{MZ_{Light}}} = \sqrt{10} = 3.16$$

This ratio may be used to define the ratio of the push period to the reflect period.

Figure 2:
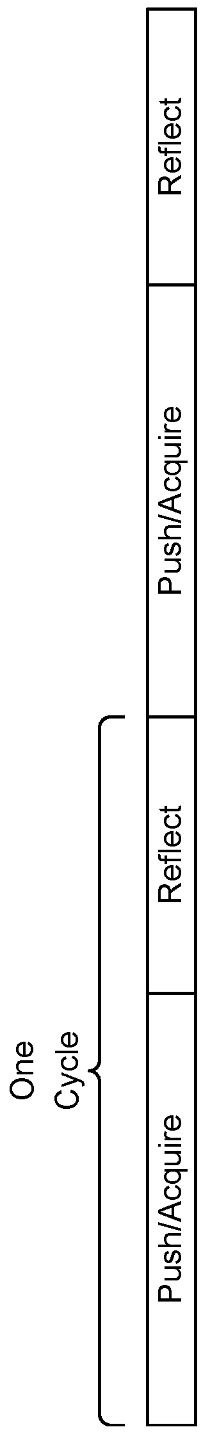
FIG. 2 is a schematic representation of a MR-TOF mass spectrometer illustrating the timing of an exemplary MP-EFP operation.

Referring to FIG. 2, which illustrates the timing of an exemplary MP-EFP operation, the push period from one cycle may be the same as the acquisition period from the previous cycle. The duration of the push period may be approximately that of the single-pass flight time of the heaviest ion of interest. The duration of the reflect period may be no longer than twice the single-pass flight time of the lightest ion of interest.

Figure 3:
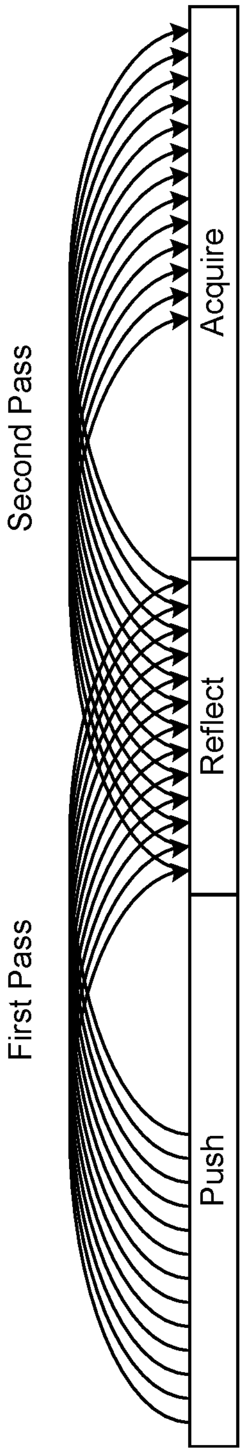
FIG. 3 is a schematic representation of a MR-TOF mass spectrometer illustrating the launching, reflecting, and arrival of the heaviest ions of interest.

During the push period, an encoded sequence of push pulses may introduce ions into a mass analyzer of the MR-TOF mass spectrometer, which may result in overlapping mass spectra. The push-and-reflect timing may be designed to allow a different mass range of ions to be reflected from each of the pushes. For example, FIG. 3 illustrates the launching, reflecting, and arrival of the heaviest ions of interest. The heaviest ions of interest may all be accommodated by the earliest 1/3.16=31.6% of the pushes.

Figure 4:
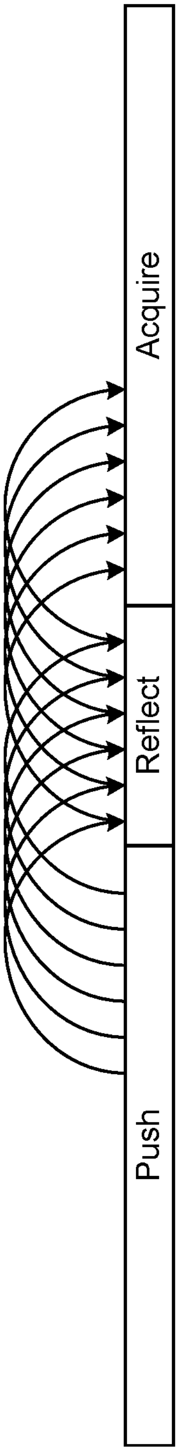
FIG. 4 is a schematic representation of a MR-TOF mass spectrometer illustrating the launching, reflecting, and arrival of the lightest ions of interest.

FIG. 4 illustrates the launching, reflecting, and arrival of the lightest ions of interest. The lightest ions of interest may all be accommodated by the latest 1/3.16=31.6% of the pushes. Similarly, ions with masses between the masses of the lightest ions and the masses of the heaviest ions may all be represented by about 31.6% of the pushes. As set forth above, the push period of one cycle may coincide with the acquisition period of the previous cycle.

In some implementations, the ion pushing device (e.g., an orthogonal accelerator) may be used to introduce ions into the MR-TOF MS mass analyzer, where the average fill time for the orthogonal accelerator along with the time required to clear the ions from the acceleration region may limit the shortest practical push interval. The average number of pushes per ion of interest may be equal to the duration of the reflect period divided by the average push interval. For example, a reflect period of 240 μs and an average push period of 6 μs may produce an average of 240/6=40 pushes for each mass, which may result in an increase in sensitivity of 40× compared to multi-pass mode without EFP.

Figure 5:
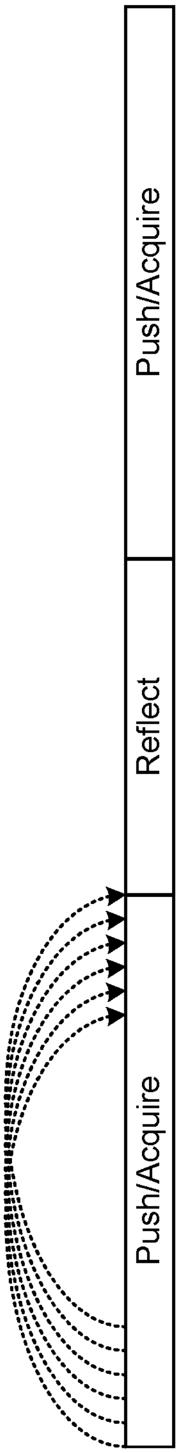
FIG. 5 is a schematic representation of a MR-TOF mass spectrometer illustrating the path of early single-pass interfering ions.
Figure 6:
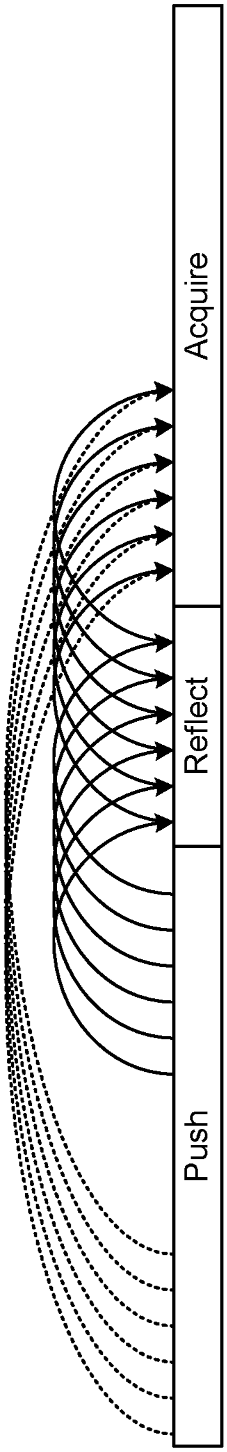
FIG. 6 is a schematic representation of a MR-TOF mass spectrometer illustrating the path of late single-pass interfering ions.
Figure 7:
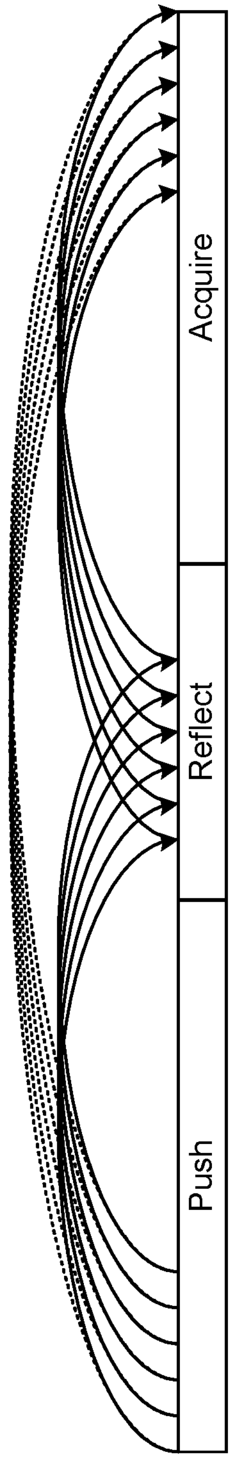
FIG. 7 is a schematic representation of a MR-TOF mass spectrometer illustrating the path of single-pass aliasing ions.
Figure 8:
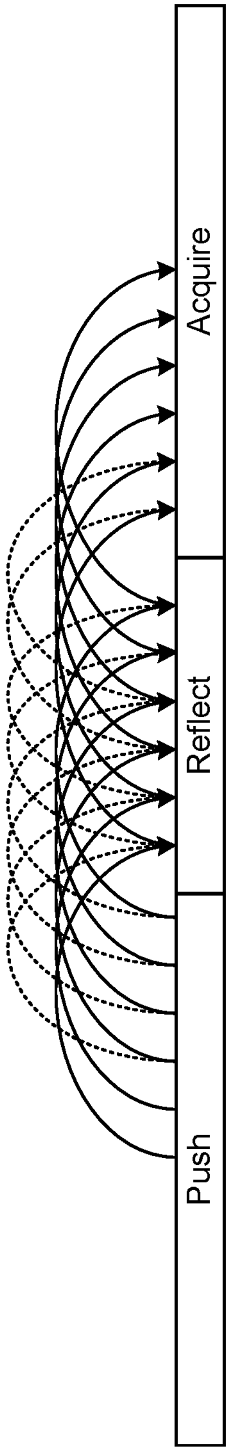
FIG. 8 is a schematic representation of a MR-TOF mass spectrometer illustrating the path of multi-pass aliasing ions.

Since only 31.6% of the ions may be reflected for a second pass, the other 68.4% of the ions may arrive at the detector after only a single-pass, or after 3+ passes through the mass analyzer. These extra ion signals may be divided into four Groups: (1) early single-pass interfering ions; (2) late single-pass interfering ions; (3) single-pass aliasing ions; and (4) multi-pass aliasing ions. FIG. 5 illustrates Group 1: single-pass ions interfering with double-pass ions from the previous cycle. FIG. 6 illustrates Group 2: single-pass ions interfering with double-pass ions from the same cycle. FIG. 7 illustrates Group 3: single-pass ions arriving at the detector having masses that exactly coincide (i.e., alias) with lower mass ions after arriving after two passes. These ion signals alias because they come from the same set of push pulses. FIG. 8 illustrates Group 4: ions taking three or more passes aliasing with double-pass ions. These ion signals alias because they come from the same set of push pulses.

Figure 9A:
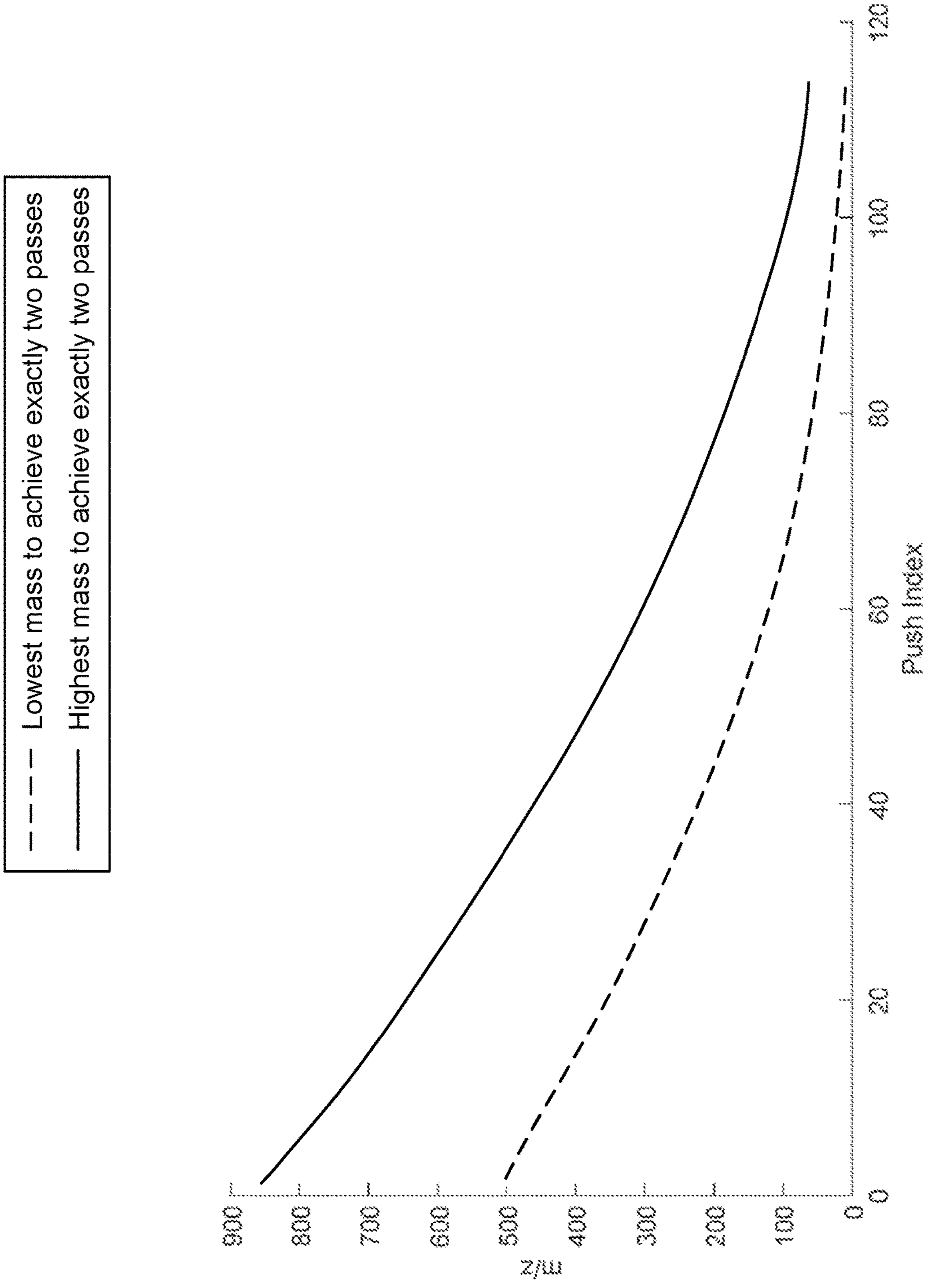
FIG. 9A is a graph illustrating the lowest and highest mass from each push which will receive a second pass through a mass spectrometer.

The extra ions may serve to shorten the life of the detector. The aliasing ions (Groups 3 and 4) may be the most severe and may prevent accurate spectra decoding. The interfering ions (Groups 1 and 2) may increase the spectral population and may degrade the decoded spectra quality. FIG. 9A illustrates the lowest and highest mass from each push which will receive a second pass through the mass analyzer. Masses outside of this range represent the extra ions which may be deflected or filtered from each push. In some implementations, only the aliasing ions are removed from each push, and the interfering ions are not removed.

There may be several possibilities, e.g., filtering devices, to reject ions which are outside the desired mass range from each push. As one example, a deflect pulser may be used to reject the unwanted ions after they have been pushed, but before they enter the main portion of the mass analyzer. The timing of the deflect pulser may be programmed to deflect a different mass range from every push. The deflect pulser may progressively change a pass window during subsequent pushes of the ions to selectively reject one or more of the ions outside of a moving mass range window of interest. As another example, a quadrupole may be used as a variable mass filter by progressively changing the pass window during subsequent pushes in order to reject ions outside of a moving mass range window of interest. The quadrupole may filter the ions before the ions are pushed by the ion pushing device and before the ions enter the mass analyzer. As yet another example, a combination of deflecting (e.g., using the deflect pulser) and filtering (e.g., using the quadrupole) could be used, along with any other suitable means for restricting the mass range of the ions for every push. For example, the quadrupole may filter low mass ions and the deflect pulser may filter high mass ions.

Figure 9B:
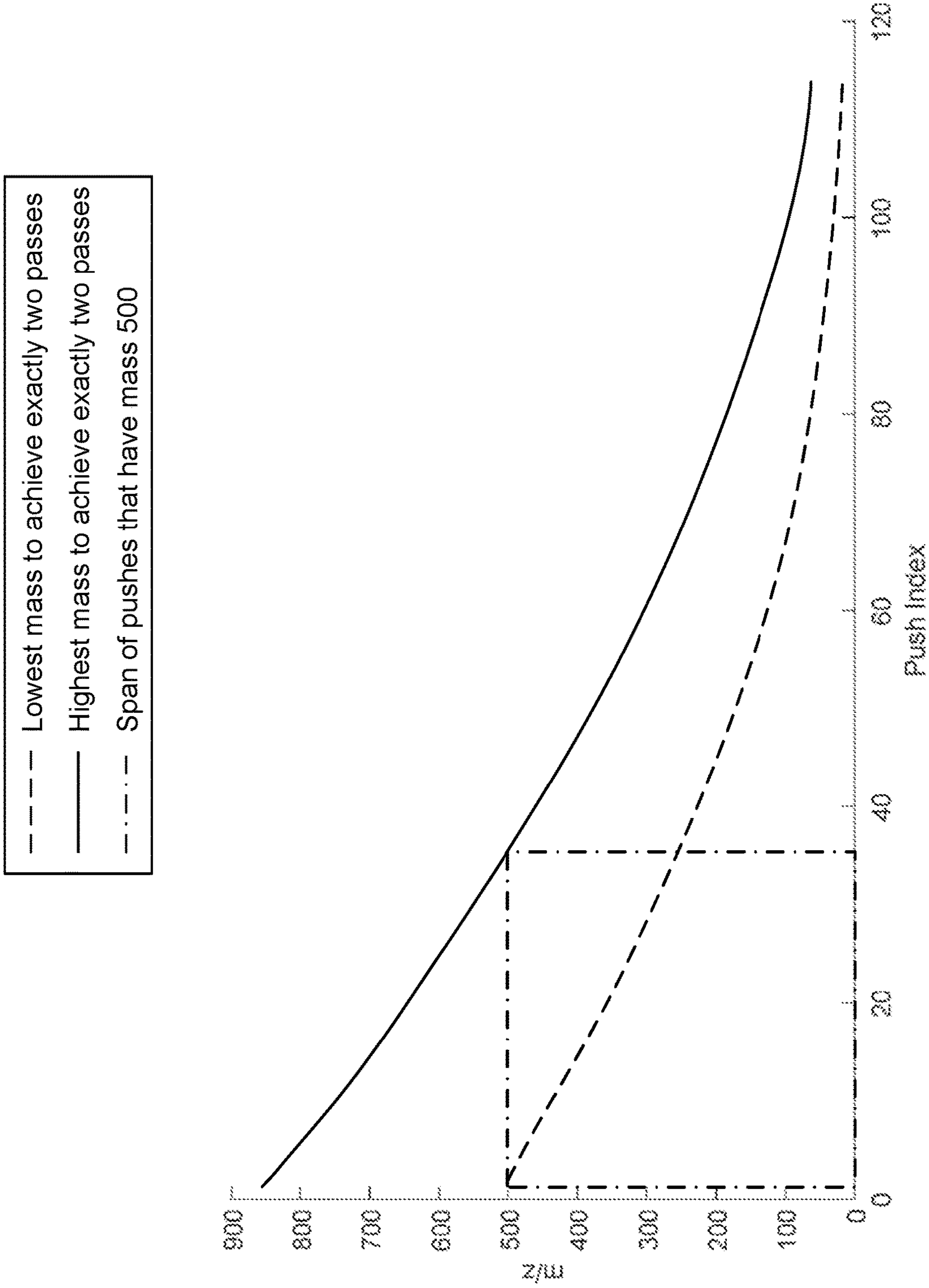
FIG. 9B is a graph illustrating the lowest and highest mass from each push which will receive a second pass through a mass spectrometer, and the span of pushes that have a mass of 500.

Referring to FIG. 9B, the plot of FIG. 9A is shown with a box illustrating the span of pushes that have a mass of 500. That is, these pushes will pass mass 500. Out of the total 114 pushes, this includes pushes 1 to 37, or about 32% of the pushes.

Figure 9C:
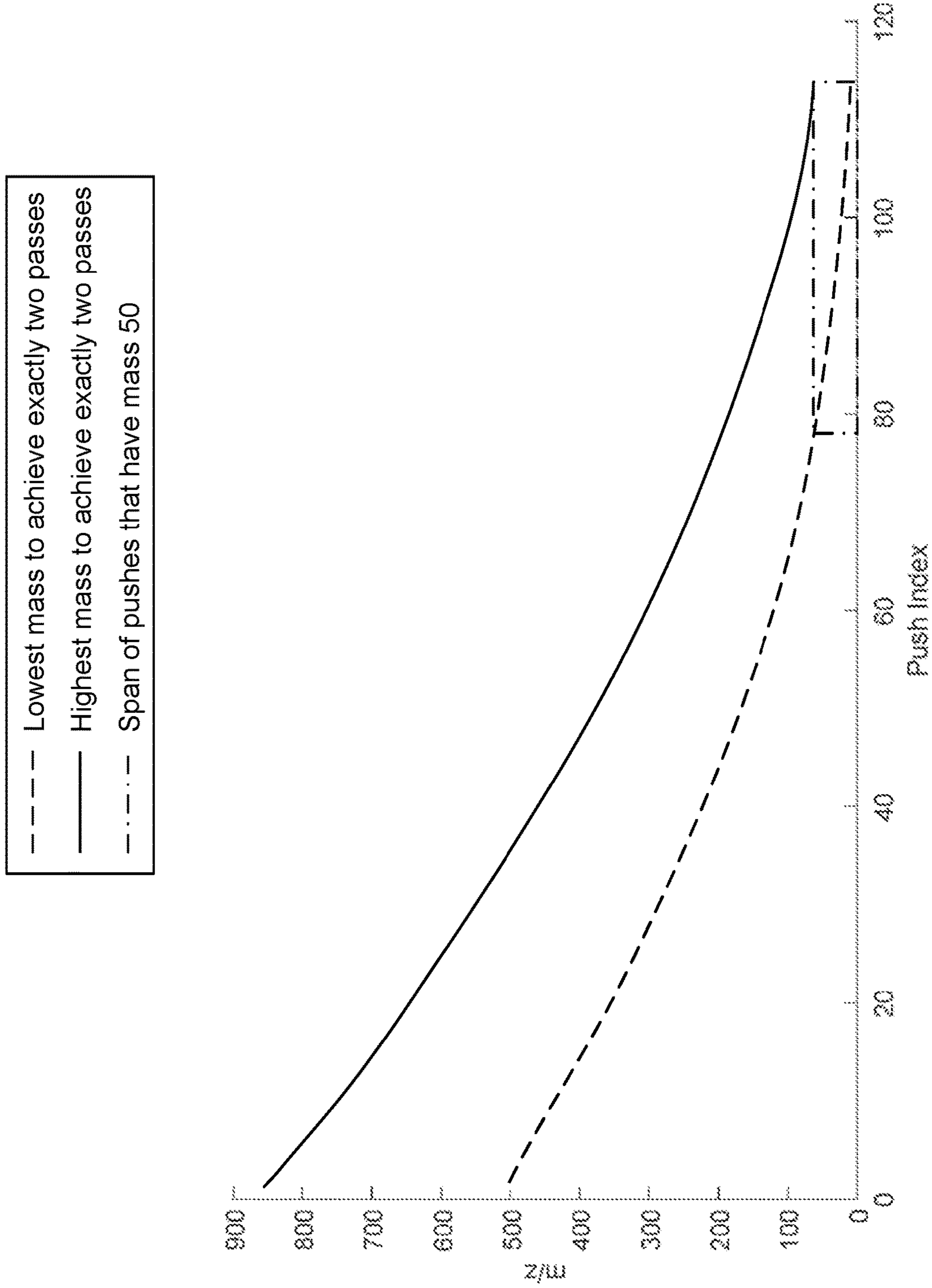
FIG. 9C is a graph illustrating the lowest and highest mass from each push which will receive a second pass through a mass spectrometer, and the span of pushes that have a mass of 50.

Referring to FIG. 9C, the plot of FIG. 9A is shown with a box illustrating the span of pushes that have a mass of 50. That is, these pushes will pass mass 50. Out of the total 114 pushes, this includes pushes 79 to 114, or about 32% of the pushes. Thus, in this example, masses between 50 and 500 may all be represented by approximately 32% of the pushes. This may be the full sensitivity mass range for a 10:1 mass range.

Continuing with this example, in some implementations, pushes outside of the mass range of 50-500 may be included, for example, 30 and 700. For mass 30, pushes 95 to 114 may be included, or about 17% of the pushes. Such an analysis may result in a lower gain of approximately 53% of the full sensitivity (i.e., 17/32=53%). For mass 700, pushes 1 to 17 may be included, or about 15% of the pushes. Such an analysis may result in a lower gain of approximately 47% of the full sensitivity (i.e., 15/32=47%).

Figure 10:
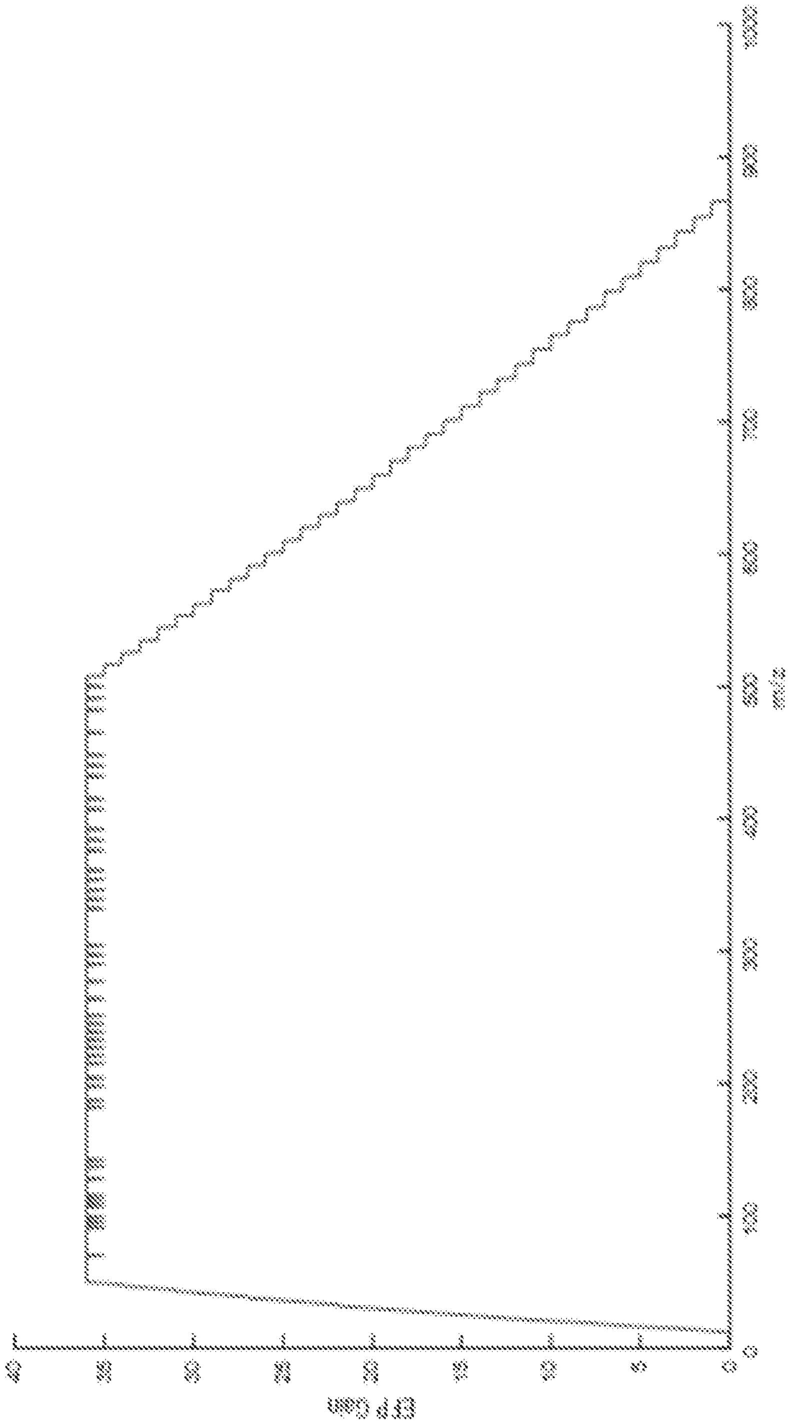
FIG. 10 is a graph illustrating EFP gain vs. mass for the ions.

Ions below the lightest ions and above the heaviest ions of interest may be decoded, although with progressively less EFP gain, i.e., fewer pushes contributing the further away the ion's mass is from the initially-intended mass range. For example, a mass about one-quarter the lowest mass of interest may be decoded with one-half the max EFP gain, as illustrated in FIG. 10. For example, as described above, masses above and below the 50-500 range may be decoded, although they may result in lower gain. For example, the mass range may be 30-700, or 23:1. In some implementations, a digital gain may be added for masses outside the full sensitivity range to correct their intensity for the roll-off in gain.

Various encoding patterns may be used to define the timing of the push intervals. Some encoding patterns may be pseudo random or random, while other encoding patterns may be calculated to minimize repeated interferences. Some encoding patterns may enforce a unique interval for each of the pushes, while other encoding patterns may only require that a subset of push intervals is unique due to the regional nature of the ion arrival times.

A MP-EFP decoder may use knowledge of the encoded push timings, the reflect timing, and the flight times of the various ions to de-convolute and reconstruct the mass spectra for the entire mass range. Even with mass filtering there may still be unavoidable mass interferences due to the overlapping spectra. Therefore, the decoder may use numerical and statistical methods to reject these interferences and consider only confirming data. In addition, the spectral population may play a role in the operation of the decoder by requiring a higher degree of signal confirmation for spectra that are more densely populated. Some decoders may use the knowledge that various ions will use the same data point in their reconstruction to more accurately predict interference and improve the quality of the decoded spectra. For example, the decoder described in U.S. Pat. No. 9,786,484 may be modified to accommodate the moving mass range window of interest that is present in multi-pass mode.

Mass spectra for various compounds may be more densely populated at the lower end of the mass range than at the higher end of the mass range. Because the ions from various mass ranges will land in different regions of the acquisition period, and due to the variable mass-dependent population of the spectra, the decoder confirmation requirements may vary for different mass intervals.

Figure 11:
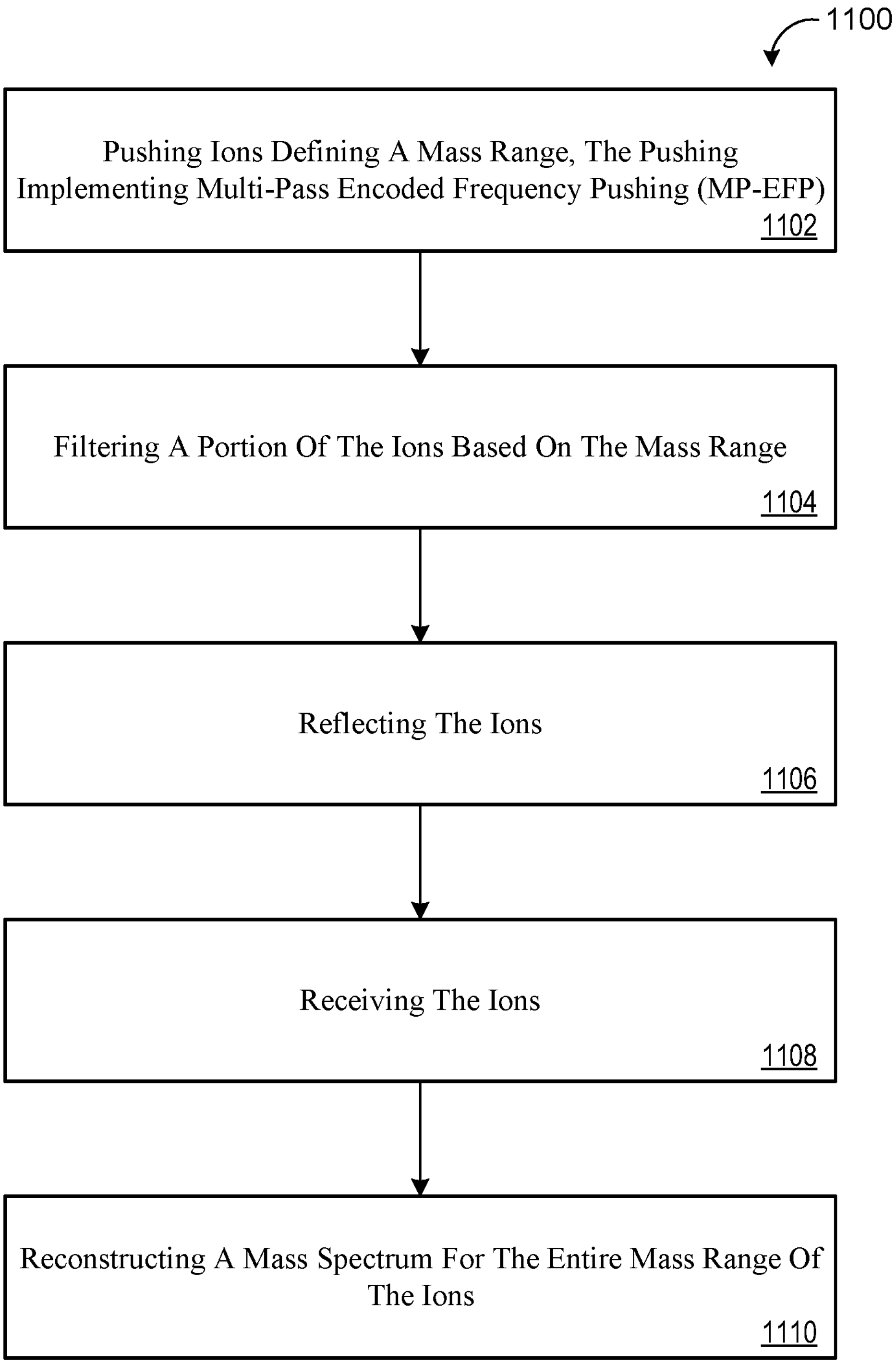
FIG. 11 is a flowchart illustrating a method for operating a mass spectrometer in accordance with principles of the present disclosure.

Referring to FIG. 11, a method 1100 for operating a MR-TOF mass spectrometer is generally shown. At step 1102, a plurality of ions defining a mass range are pushed via an ion pushing device. The pushing implements MP-EFP. At step 1104, a portion of the plurality of ions are filtered based on the mass range via a filtering device (e.g., a deflect pulser, a quadrupole, etc.). At step 1106, the plurality of ions are reflected via at least one reflector. In some implementations, a portion of the plurality of ions are filtered (e.g., using a quadrupole) prior to being pushed via the ion pushing device and prior to entering the mass analyzer. In other implementations, a portion of the plurality of ions are filtered (e.g., using a deflect pulser) after they are pushed but before they enter the main mass analyzer. At step 1108, the plurality of ions are received via a detector. At step 1110, a mass spectrum for the entire mass range of the plurality of ions is reconstructed via a decoder. It should be understood that the method 1100 described herein may include fewer, additional, and/or different steps, and the steps may be performed in any suitable order.

A number of implementations have been described. Nevertheless, it will be understood that various modifications may be made without departing from the spirit and scope of the disclosure. Accordingly, other implementations are within the scope of the following claims.

What is claimed is:

1. A time-of-flight mass spectrometer (TOF MS) comprising:
- a mass analyzer;
- an ion pushing device arranged to push ions into the mass analyzer;
- a filtering device arranged to filter a portion of the ions based on a mass range of the ions, the filtering device arranged to remove a portion of the ions after the ions are pushed to progressively change a pass window during subsequent pushes of the ions to selectively reject one or more of the ions outside of a moving mass range window of interest;
- a multi-pass reflector arranged to selectively reflect the ions for further passes through the mass analyzer;
- a detector arranged to receive the ions; and
- a decoder arranged to reconstruct a mass spectrum for the entire mass range of the ions.

2. The TOF MS of claim 1, wherein the TOF MS is operating in multi-pass mode where the ions take more than one pass through the mass analyzer to increase flight time and mass resolution.

3. The TOF MS of claim 1, wherein the filtering device is arranged to remove ions outside of the mass range window of interest.

4. The TOF MS of claim 1, wherein the filtering device includes a deflect pulser arranged to remove a portion of the ions after the ions are pushed by the ion pushing device.

5. The TOF MS of claim 1, wherein the filtering device further includes a quadrupole arranged to remove the portion of the ions before the ions are pushed by the ion pushing device.

6. The TOF MS of claim 1, wherein the ion pushing device is arranged to implement an encoding pattern to define the timing of push intervals for the ions.

7. The TOF MS of claim 6, wherein the encoding pattern is substantially random.

8. The TOF MS of claim 6, wherein the encoding pattern is calculated to minimize repeated interferences.

9. A method for operating a time-of-flight mass spectrometer (TOF MS), the method comprising:

pushing, via an ion pushing device, ions into a mass analyzer of the TOF MS;

filtering, via a filtering device, a portion of the ions based on a mass range of the ions, the filtering device arranged to remove a portion of the ions after the ions are pushed to progressively change a pass window during subsequent pushes of the ions to selectively reject one or more of the ions outside of a moving mass range window of interest;

reflecting, via a multi-pass reflector, the ions for further passes through the mass analyzer;

receiving, via a detector, the ions; and reconstructing, via a decoder, a mass spectrum for the entire mass range of the ions.

10. The method of claim 9, wherein the TOF MS is operating in multi-pass mode where the ions take more than one pass through the mass analyzer to increase flight time and mass resolution.

11. The method of claim 9, wherein the filtering device removes ions outside of the mass range window of interest.

12. The method of claim 9, wherein the filtering device includes a deflect pulser arranged to remove the portion of the ions after the ions are pushed by the ion pushing device.

13. The method of claim 9, wherein the filtering device further includes a quadrupole arranged to remove the portion of the ions before the ions are pushed by the ion pushing device.

14. The method of claim 9, wherein the ion pushing device is arranged to implement an encoding pattern to define the timing of push intervals for the ions.

15. The method of claim 14, wherein the encoding pattern is substantially random.

16. The method of claim 14, wherein the encoding pattern is calculated to minimize repeated interferences.

* * * * *